(12) United States Patent
Matsushita et al.

(10) Patent No.: US 12,191,983 B2
(45) Date of Patent: Jan. 7, 2025

(54) TIME-POINT SYNCHRONIZATION APPARATUS, TIME-POINT SYNCHRONIZATION METHOD, AND NON-TRANSITORY COMPUTER READABLE MEDIUM

(71) Applicant: Mitsubishi Electric Corporation, Tokyo (JP)

(72) Inventors: Ryuma Matsushita, Tokyo (JP); Sachiko Taniguchi, Tokyo (JP); Yoshifumi Hotta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 267 days.

(21) Appl. No.: 17/987,148

(22) Filed: Nov. 15, 2022

(65) Prior Publication Data
US 2023/0076512 A1 Mar. 9, 2023

Related U.S. Application Data

(63) Continuation of application No. PCT/JP2020/026821, filed on Jul. 9, 2020.

(51) Int. Cl.
*H04J 3/06* (2006.01)
*H04L 7/00* (2006.01)

(52) U.S. Cl.
CPC .......... *H04J 3/0658* (2013.01); *H04J 3/0667* (2013.01); *H04L 7/0016* (2013.01)

(58) Field of Classification Search
CPC ...... H04J 3/0658; H04J 3/0667; H04L 7/0016
See application file for complete search history.

(56) References Cited

U.S. PATENT DOCUMENTS 8,189,624 B2    5/2012  Sakurada et al.
10,085,224 B2   9/2018  Powell et al.
(Continued)

FOREIGN PATENT DOCUMENTS

EP    3444789 A1      2/2019
JP    2013-34157 A    2/2013
(Continued)

OTHER PUBLICATIONS

Indian Office Action for Indian Application No. 202247076846, dated Mar. 13, 2023, with English translation.
(Continued)

*Primary Examiner* — Chandrahas B Patel
(74) *Attorney, Agent, or Firm* — Birch, Stewart, Kolasch & Birch, LLP

(57) ABSTRACT

A time-point synchronization apparatus (10) includes a time-point management unit (144), a time-gap counter (145), and a time-gap calculation unit (142). The time-point management unit (144) manages an apparatus time point equivalent to a current time point. The time-gap counter (145) records a time gap which is a different between a time point indicated in reception information and the apparatus time point. When a frequency in the time-gap counter (145), corresponding to the time gap corresponding to a latest reception time point corresponding to latest reception information is treated as the highest among all of frequencies indicated in the time-gap counter (145), the time-gap calculation unit (142) synchronizes the apparatus time point to the latest reception time point.

18 Claims, 7 Drawing Sheets

(56) References Cited

U.S. PATENT DOCUMENTS

| | | | |
|---|---|---|---|
| 10,197,974 B2* | 2/2019 | Osagawa | H04J 3/0638 |
| 11,722,288 B2* | 8/2023 | Arai | H04J 3/0667 |
| | | | 370/350 |
| 2012/0163367 A1 | 6/2012 | Choi et al. | |
| 2018/0253062 A1* | 9/2018 | Yuruzume | H04N 1/00068 |
| 2019/0132071 A1 | 5/2019 | Matsunaga et al. | |
| 2022/0006546 A1* | 1/2022 | Chen | H04W 56/001 |

FOREIGN PATENT DOCUMENTS

| | | |
|---|---|---|
| JP | 2015-114290 A | 6/2015 |
| JP | 2015-119257 A | 6/2015 |
| JP | 2016-139846 A | 8/2016 |
| JP | 2016-152488 A | 8/2016 |
| WO | WO 2014/109255 A1 | 7/2014 |
| WO | WO 2015/146112 A1 | 10/2015 |
| WO | WO 2017/179608 A1 | 10/2017 |

OTHER PUBLICATIONS

International Search Report, issued in PCT/JP2020/026821, PCT/ISA/210, dated Sep. 29, 2020.
Time-Sensitive Networking Task Group of IEEE 802.1, "IEEE P802.1AS-Rev/D8.0 Draft Standard for Local and Metropolitan Area Networks Timing and Synchronization for Time-Sensitive Applications", the Institute of Electrical and Electronics Engineers, Jan. 16, 2019, total 446 pages.
Written Opinion of the International Searching Authority, issued in PCT/JP2020/026821, PCT/ISA/237, dated Sep. 29, 2020.
Indian Office Action for Indian Application No. 202247076846, dated Oct. 10, 2024, with English translation.

* cited by examiner

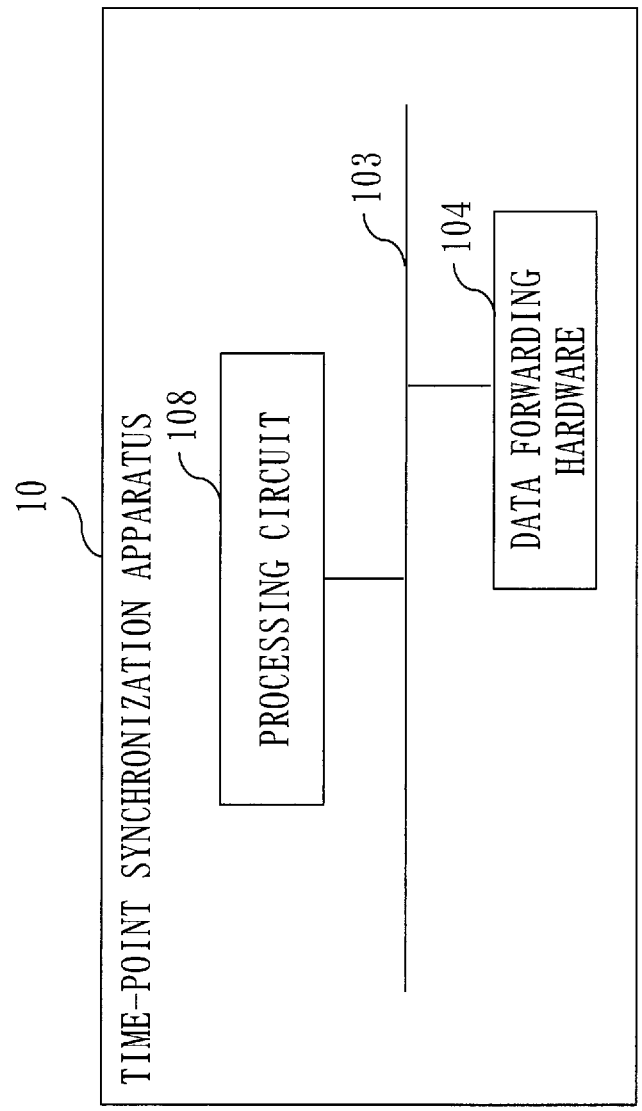

TIME-POINT SYNCHRONIZATION APPARATUS, TIME-POINT SYNCHRONIZATION METHOD, AND NON-TRANSITORY COMPUTER READABLE MEDIUM

CROSS REFERENCE TO RELATED APPLICATIONS

This application is a Continuation of PCT International Application No. PCT/JP2020/026821 filed on Jul. 9, 2020, which is hereby expressly incorporated by reference into the present application.

TECHNICAL FIELD

The present disclosure relates to a time-point synchronization apparatus, a time-point synchronization method, and a time-point synchronization program.

BACKGROUND ART

There is the gPTP (generalized Precision Time Protocol) as a communication protocol for synchronizing time points between apparatuses connected via a network. The gPTP is stipulated by IEEE (Institute of Electrical and Electronics Engineers) P802.1AS-Rev/D8.0 (Non-Patent Literature 1). In the gPTP, timestamps time-stamped in the apparatuses are exchanged between the apparatuses. Thereby, transmission delay between the apparatuses, and a frame retention time in the apparatus are measured, and time-point synchronization between the apparatuses is realized with accuracy of a microsecond or shorter.

CITATION LIST

Non-Patent Literature

Non-Patent Literature 1: Time-Sensitive Networking Task Group of IEEE 802.1, "IEEE P802.1AS-Rev/D8.0 Draft Standard for Local and Metropolitan Area Networks Timing and Synchronization for Time-Sensitive Applications", the Institute of Electrical and Electronics Engineers, 2019, January

SUMMARY OF INVENTION

Technical Problem

In the gPTP, control frames are exchanged between adjacent apparatuses in order to synchronize time points between the apparatuses. Each apparatus time-stamps a reception time point and a transmission time point of the control frame, and stores the timestamps of the time-stamped reception time point and transmission time point in the control frame. Thereby, each apparatus measures the transmission delay between the apparatuses, and the frame retention time in the apparatus, and synchronizes the time points between the apparatuses connected via the network.

However, since an error (hereinafter, a time-stamping error) occurs in the acquired timestamp because of time-stamping granularity in each apparatus, a measured value may be inconsistent on each occasion of measuring the transmission delay and the retention time. For example, a timestamp acquired in an apparatus whose time-stamping granularity is 8 ns is expected to include an error, which is a positive value, up to 7.9999 . . . ns from a time point when the control frame is actually transmitted or received. Thus, each measured value of the transmission delay and the retention time is expected to include an error moving within a range between about −8 ns and about +8 ns. In a worst case, the errors included in the transmission delay and the retention time accumulate as either a positive value or a negative value, each time the control frame is transferred via the apparatus. Therefore, it is necessary to reduce the error and decrease the inconsistency in the error in a system connecting network apparatuses in a cascading way.

The present disclosure aims to reduce an error in time-point synchronization, resulted from a time-stamping error, and inconsistency in the error in a system connecting network apparatuses in a cascading way.

Solution to Problem

A time-point synchronization apparatus according to the present disclosure, which receives as a plurality of pieces of reception information, a plurality of pieces of information each of which includes time-point correspondence information which is information used for calculating a current-time-point equivalent time point that indicates a time point at present and that is equivalent to a current time point which changes with passage of time, includes:

a time-point management unit to manage and maintain the current-time-point equivalent time point as an apparatus time point;

a counter storage unit to store a time-gap counter which includes one or more individual counters, on a premise that reception information received the most lately by the time-point synchronization apparatus serves as latest reception information and one or more pieces of reception information other than the latest reception information collectively serve as past reception information, among the plurality of pieces of reception information, where the time-gap counter has been provided according to counter granularity which is granularity corresponding to a time point, and also has been provided by converting into a frequency, each of one or more time gaps indicating each difference between each of current-time-point equivalent time points and each of apparatus time points, and by recording one or more frequencies, each of the current-time-point equivalent time points being calculated using each piece of time-point correspondence information included in each piece of past reception information, each of the apparatus time points being corresponding to a time when the time-point synchronization apparatus receives each piece of past reception information; and a time-gap calculation unit to adopt as a latest reception time point, a current-time-point equivalent time point calculated using time-point correspondence information included in the latest reception information, calculate as a calculated time gap, a time gap indicating a difference between the latest reception time point and an apparatus time point corresponding to a time when the latest reception information is received, adopt as a selected counter, a counter in the time-gap counter, corresponding to the calculated time gap, increment a frequency in the selected counter by one, and when the frequency indicated in the selected counter is treated as the highest among all of frequencies indicated in the time-gap counter, synchronize an apparatus time point at present to a time point corresponding to the latest reception time point.

Advantageous Effects of Invention

According to a time-point synchronization apparatus according to the present disclosure, it is possible to reduce an error in time-point synchronization, resulted from a time-stamping error, and inconsistency in the error in a system connecting network apparatuses in a cascading way.

BRIEF DESCRIPTION OF DRAWINGS

FIG. 7 is a hardware configuration example of the time-point synchronization apparatus 10 according to a modification example of the first embodiment.

DESCRIPTION OF EMBODIMENTS

Figure 1:
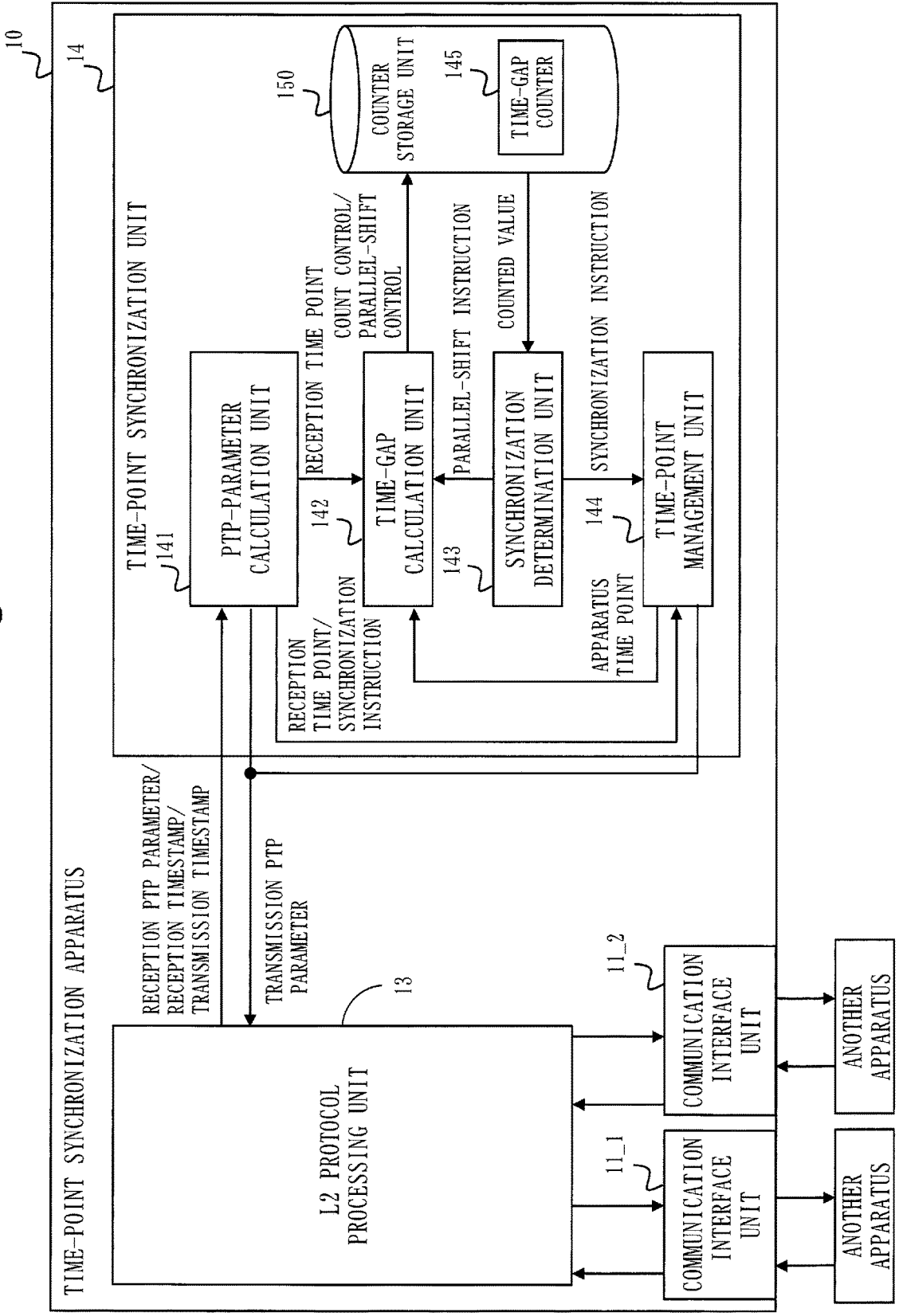
FIG. 1 is a functional configuration example of a time-point synchronization apparatus 10 according to a first embodiment.

In descriptions of the embodiments and the drawings, the same reference numerals are assigned to the same elements or corresponding elements. Descriptions of the elements assigned the same reference numerals will be omitted or simplified as necessary. Arrows in the drawings mainly indicate flows of data or flows of processes.

First Embodiment

Below, details of the present embodiment will be described with reference to the drawings.
*Description of Configuration*

FIG. 1 illustrates a functional configuration example of a time-point synchronization apparatus 10 according to a first embodiment. As illustrated in the present diagram, the time-point synchronization apparatus 10 includes a communication interface unit 11, an L2 (Layer 2) protocol processing unit 13, and a time-point synchronization unit 14.

The communication interface unit 11 is an interface which transmits and receives a communication frame to and from an adjacent apparatus. The communication interface unit 11 receives a plurality of pieces of information as a plurality of pieces of reception information. That is, the time-point synchronization apparatus 10 receives the plurality of pieces of information as the plurality of pieces of reception information. Each of the plurality of pieces of information includes time-point correspondence information. The time-point correspondence information is information used for calculating a current-time-point equivalent time point. The current-time-point equivalent time point indicates a time point at present and is equivalent to a current time point which changes with passage of time. The current-time-point equivalent time point is a time point that an apparatus such as a computer treats as the current time point. The current-time-point equivalent time point may be or may not be a precise current time point.

The number of communication interface units 11 included in the time-point synchronization apparatus 10 is not specified. In FIG. 1, the time-point synchronization apparatus 10 includes two communication interface units 11. The two communication interface units 11 are written as a communication interface unit 11_1 and a communication interface unit 11_2 in order to distinguish these two.

The L2 protocol processing unit 13 analyzes the frame received by the communication interface unit 11 and transfers reception time-point information to the time-point synchronization unit 14. The reception time-point information is data required for the time-point synchronization unit 14 to synchronize the time points. Specific examples of the reception time-point information are a PTP (Precision Time Protocol) parameter, a reception timestamp, and a transmission timestamp. The reception timestamp indicates a time point when the time-point synchronization apparatus 10 receives data. The transmission timestamp indicates a time point when another apparatus transmits the data.

The L2 protocol processing unit 13 may transfer the PTP parameter to the time-point synchronization unit 14, as a reception PTP parameter.

The time-point synchronization unit 14 includes a PTP-parameter calculation unit 141, a time-gap calculation unit 142, a synchronization determination unit 143, a time-point management unit 144, and a counter storage unit 150.

The time-point synchronization unit 14 calculates a time point which the time-point synchronization apparatus 10 synchronizes, based on the information received from the L2 protocol processing unit 13.

The PTP-parameter calculation unit 141 calculates a time point indicated in the reception time-point information, using the reception time-point information, based on the gPTP (generalized Precision Time Protocol).

The PTP-parameter calculation unit 141 is also referred to as a Precision-Time-Protocol-parameter calculation unit. Each of the plurality of pieces of reception information may include information conforming to the generalized Precision Time Protocol, as the time-point correspondence information. In this case, the time-point synchronization apparatus 10 calculates the current-time-point equivalent time point corresponding to the time-point correspondence information included in each of the plurality of pieces of reception information, based on the generalized Precision Time Protocol, using the time-point correspondence information included in each of the plurality of pieces of reception information.

The PTP-parameter calculation unit 141 transfers the PTP parameter to the L2 protocol processing unit 13, as a transmission PTP parameter. The transmission PTP parameter may be a combination of data output by the PTP-parameter calculation unit 141 and data output by the time-point management unit 144.

Figure 2:
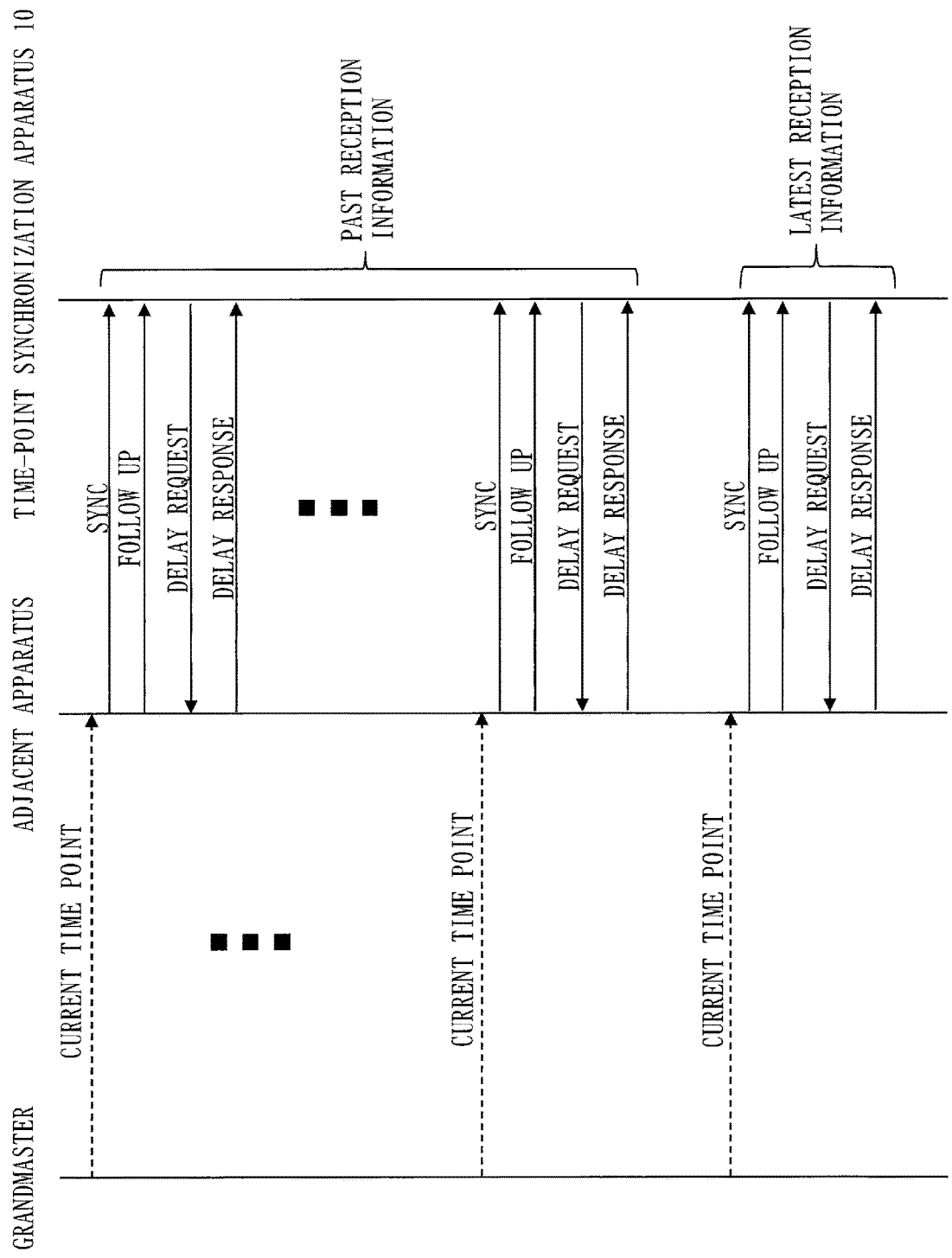
FIG. 2 is a sequence diagram illustrating an example in which the time-point synchronization apparatus 10 receives information conforming to the gPTP, according to the first embodiment.

FIG. 2 is a sequence diagram illustrating an example of a case where the time-point synchronization apparatus 10 receives information including the information conforming to the gPTP, as the time-point correspondence information. With reference to the present diagram, the information received by the time-point synchronization apparatus 10, and the like will be described.

The present example is equivalent to a case where a plurality of network apparatuses are connected in a cascading way. In the present diagram, a grandmaster manages "current time point". "Current time point" does not need to be a precise current time point. The grandmaster and the time-point synchronization apparatus 10 may not communicate with each other directly. One or more apparatuses may exist between the grandmaster and the adjacent apparatus. The grandmaster transmits information corresponding to "current time point", to another apparatus. The adjacent apparatus receives the information corresponding to "current time point" directly or indirectly from the grandmaster, and synchronizes to "current time point" corresponding to the received information. At this time, "current time point" corresponding to the information transmitted by the grandmaster and "current time point" to which the adjacent apparatus synchronizes are usually different from each other mainly because of time-stamping granularity of each apparatus. That is, the time-point synchronization apparatus 10 does not necessarily synchronize to "current time point" managed by the grandmaster. The adjacent apparatus communicates with the time-point synchronization apparatus 10 directly. The time-point synchronization apparatus 10 calculates the current-time-point equivalent time point, using "SYNC", "FOLLOW UP", "DELAY REQUEST", and "DELAY RESPONSE". These pieces of information may be grouped information. Further, in the present diagram, three dots in series represent that an illustration of intermediate processes are omitted.

The time-gap calculation unit 142 calculates a time gap. The time gap is a difference between the time point calculated by the PTP-parameter calculation unit 141 and a time point maintained by the time-point management unit 144. The time gap may be a negative value. Each of the time points may be a time point calculated in consideration of a period of time elapsed from a time of the calculation or a time of the acquisition.

The time-gap calculation unit 142 calculates as a calculated time gap, the time gap indicating a difference between a latest reception time point and an apparatus time point corresponding to a time when latest reception information is received. Here, reception information received by the time-point synchronization apparatus 10 the most lately among the plurality of pieces of reception information serves as the latest reception information. One or more pieces of reception information other than the latest reception information among the plurality of pieces of reception information collectively serve as past reception information. The latest reception time point is the current-time-point equivalent time point calculated using the time-point correspondence information included in the latest reception information. The latest reception time point is not limited to a time point when the latest reception information is transmitted, or a time point when the time-point synchronization apparatus 10 receives the latest reception information. The time-gap calculation unit 142 adopts as a selected counter, a counter in a time-gap counter 145, corresponding to the calculated time gap, and increases a frequency in the selected counter by one. When the frequency indicated in the selected counter is treated as the highest among all of the frequencies indicated in the time-gap counter 145, the time-gap calculation unit 142 synchronizes the current apparatus time point to the time point corresponding to the latest reception time point. The apparatus time point corresponding to the time when the latest reception information is received is a time point compared with the time point calculated based on the latest reception information. A specific example of the apparatus time point corresponding to the time when the latest reception information is received is an apparatus time point at the time when the latest reception information is received, or an apparatus time point at a time when the latest reception information is transmitted. A specific example of the time point corresponding to the latest reception time point is a time point calculated based on the latest reception time point in consideration of a period of time elapsed from the time point when the latest reception information is received, until the current time.

The time-gap calculation unit 142 executes count control and parallel-shift control. The count control is to control a counted value in the time-gap counter 145. The parallel-shift control is to shift a whole time-gap counter 145 in parallel along an axis as necessary.

When the frequency indicated in the counter in the time-gap counter 145, corresponding to the calculated time gap is treated as the highest among all of the frequencies indicated in the time-gap counter 145, the time-gap calculation unit 142 shifts the whole time-gap counter 145 in parallel so that the calculated time gap is treated as not existing.

Figure 3:
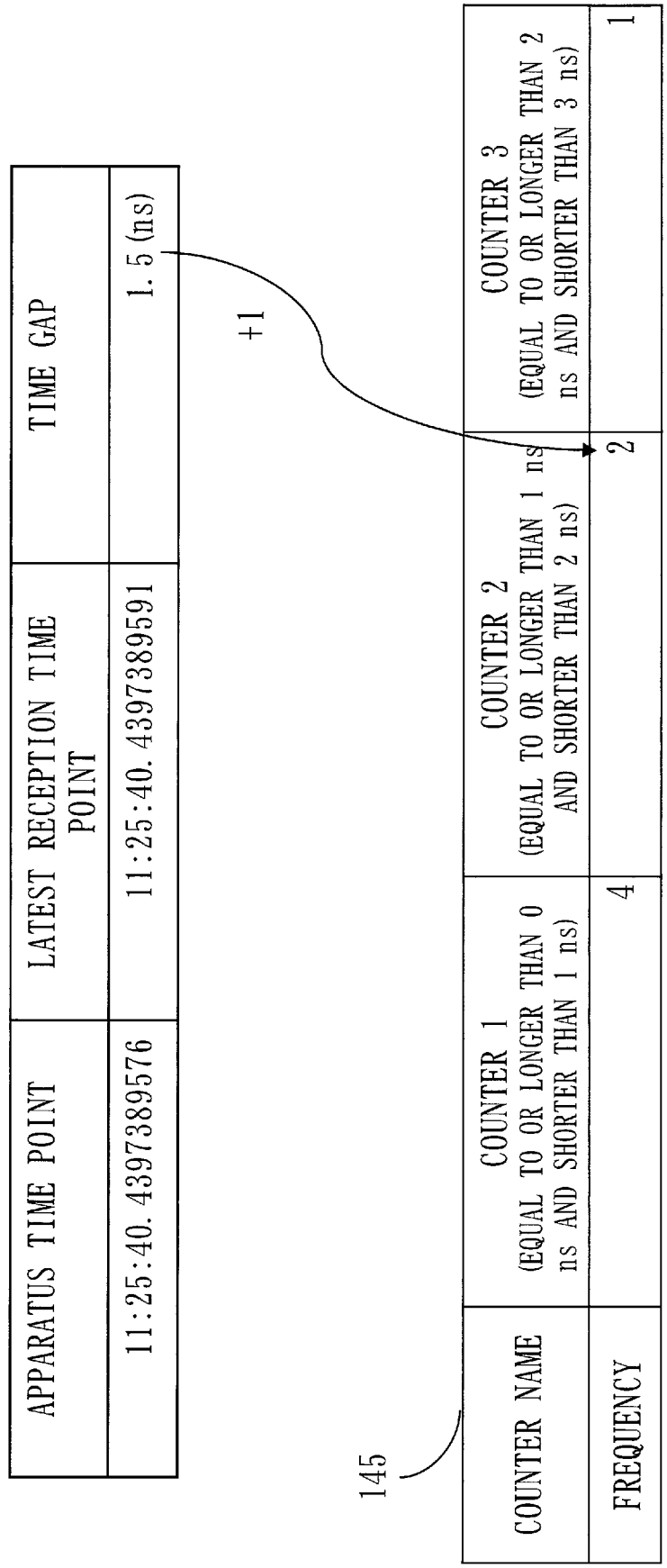
FIG. 3 is an example of a time gap according to the first embodiment.

FIG. 3 illustrates an example of the time gap. With reference to the present diagram, the time gap will be described.

In the present diagram, each of the apparatus time point and the latest reception time point is recorded in a unit of granularity of 0.1 ns. The difference between the apparatus time point and the latest reception time point is 1.5 ns, and this difference is the time gap. One column in a table of the time-gap counter 145 corresponds to one counter. The time-gap counter 145 has a counter 1, a counter 2, and a counter 3 as individual counters. The individual counters in the time-gap counter 145 correspond to counter granularity of 1 ns. That is, the individual counters in the time-gap counter 145 correspond to a time range of 1 ns. The number of counters included in the time-gap counter 145 may be more or less as necessary.

When the apparatus time point and the latest reception time point are as illustrated in the present diagram, the time-gap calculation unit 142 first calculates 1.5 ns as the calculated time gap. Next, the time-gap calculation unit 142 increments the frequency in the counter 2.

The synchronization determination unit 143 receives the counted value from the time-gap counter 145. The synchronization determination unit 143 determines whether or not the apparatus time point is to be synchronized to the time point calculated by the PTP-parameter calculation unit 141 the most lately, based on the time-gap counter 145.

The synchronization determination unit 143 determines whether or not the frequency indicated in the counter in the time-gap counter 145, corresponding to the calculated time gap is treated as the highest among all of the frequencies indicated in the time-gap counter 145. When the frequency indicated in the counter in the time-gap counter 145, corresponding to the calculated time gap is the highest among all of the frequencies indicated in the time-gap counter 145, the synchronization determination unit 143 may treat the frequency indicated in the counter in the time-gap counter 145, corresponding to the calculated time gap, as the highest among the all of the frequencies indicated in the time-gap counter 145.

The time-point management unit 144 maintains a time point in the time-point synchronization apparatus 10. The time point in the time-point synchronization apparatus 10 is referred to as the apparatus time point. The apparatus time point is a time point maintained by the time-point synchronization apparatus 10 as the time point at present. The time-point management unit 144 manages and maintains the current-time-point equivalent time point as the apparatus time point.

As a specific example, the time-point management unit 144 calculates a clock ratio between the grandmaster and the time-point synchronization apparatus 10, according to the gPTP, and advances the apparatus time point while correcting the apparatus time point based on the clock ratio.

Further, the apparatus time point may be transferred to the L2 protocol processing unit 13, then stored in a PTP control frame, and then transmitted from the communication interface unit 11 to another apparatus, The counter storage unit 150 stores the time-gap counter 145.

The time-gap counter 145 is a counter which records the time gap calculated by the time-gap calculation unit 142. The time-gap counter 145 is typically a set of a plurality of counters. The frequency in one time-gap counter 145 is incremented when the time-gap is in a certain range. The granularity of the time gap, corresponding to the time-gap counter 145 may be any value The time-gap counter 145 includes one or more individual counters each of which converts each of one or more time gaps into the frequency and records the frequency. One counter corresponds to a certain time range and records the frequency for the certain time range. The time range that each of the one or more individual counters corresponds to is different from the others and does not overlap the others. Each of the one or more time gaps indicates each difference between each of the current-time-point equivalent time points calculated using the time-point correspondence information included in each piece of past reception information and each of the apparatus time points corresponding to each time when the time-point synchronization apparatus 10 receives each piece of past reception information. The apparatus time point corresponding to the time when each piece of past reception information is received is equivalent to the apparatus time point corresponding to the time when the latest reception information is received. The time-gap counter 145 is the one or more individual counters provided according to the counter granularity which is granularity corresponding to the time point. The time-gap counter 145 at a certain time indicates by the frequency, a distribution of the difference between the timepoint corresponding to each piece of past reception information and the apparatus time point at the certain time. The time point corresponding to each piece of past reception information is the current-time-point equivalent time point calculated based on each piece of the past reception information, and also the current-time-point equivalent time point at the certain time.

As a specific example, the time-gap counter 145 is constituted by a plurality of counters based on certain granularity. The certain granularity is also referred to as the counter granularity. In this case, as a specific example, the time-gap counter 145 includes a counter which increments the frequency when the time gap is equal to or longer than 8 ns and shorter than 9 ns, a counter which increments the frequency when the time gap is equal to or longer than 9 ns and shorter than 10 ns, and so on. In the present example, initial values in all of the counters are zero.

In the example of FIG. 2, four pieces of information described at the bottom are the latest reception information, and the pieces of information received before the latest reception information is received are the past reception information. In the present diagram, each of the latest reception information and the past reception information includes "DELAY REQUEST", however, none of the latest reception information and the past reception information needs to include "DELAY REQUEST". Further, information other than the pieces of information constituting the latest reception information may be used, when the latest reception time point is calculated.

Hardware which realizes the time-point synchronization apparatus 10 will be described. The time-point synchronization apparatus 10 is constituted by a computer. The time-point synchronization apparatus 10 may be constituted by a plurality of computers.

Figure 4:
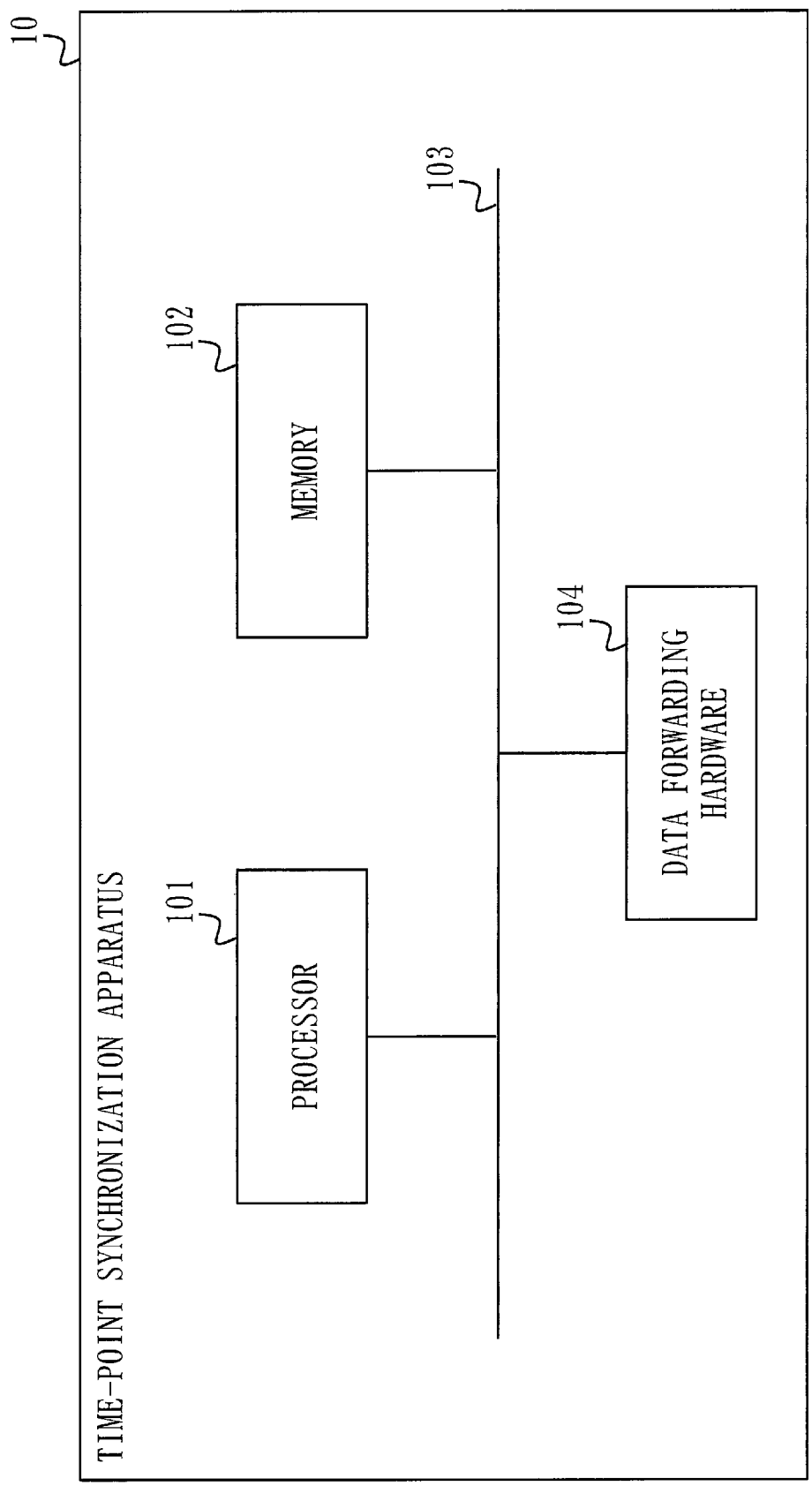
FIG. 4 is a hardware configuration example of the time-point synchronization apparatus 10 according to the first embodiment.

FIG. 4 illustrates a hardware configuration example of the time-point synchronization apparatus 10. The time-point synchronization apparatus 10 can be realized by a processor 101, a memory 102, and data forwarding hardware 104 as illustrated in the present diagram. These pieces of hardware are connected to each other via a bus 103.

The processor 101 is an IC (Integrated Circuit) which performs a computation process, and controls the pieces of hardware included in the computer. As a specific example, the processor 101 is a CPU (also referred to as Central Processing Unit, a central processing device, a processing device, a computation device, a processor, a microprocessor, a microcomputer, or a Digital Signal Processor) or system LSI (Large Scale Integration).

The time-point synchronization apparatus 10 may include a plurality of processors which substitute the processor 101. The plurality of processors share a role of the processor 101.

The memory 102 is a storage device. As a specific example, the memory 102 is: a volatile or non-volatile semiconductor memory such as a RAM (Random Access Memory), a ROM (Read Only Memory), a flash memory, an EPROM (Erasable Programmable Read Only Memory), or an EEPROM (Electrically Erasable Programmable Read-Only Memory); a magnetic disk, a flexible disk, an optical disc, a compact disc, a MiniDisc, a DVD (Digital Versatile Disc), or a combination of some of these. The memory 102 may be divided into a main storage device and an auxiliary storage device.

The data forwarding hardware 104 is a receiver and a transmitter. As a specific example, the data forwarding hardware 104 is a communication chip or an NIC (Network Interface Card).

The communication interface unit 11 is realized by the data forwarding hardware 104.

The L2 protocol processing unit 13 and the time-point synchronization unit 14 are realized by hardware, software, firmware, or a combination of these. The software and the firmware are written as programs and stored in the memory 102.

When the L2 protocol processing unit 13 and the time-point synchronization unit 14 are realized by the software or the firmware, the L2 protocol processing unit 13 and the time-point synchronization unit 14 are realized by reading a time-point synchronization program from the memory 102 and executing the time-point synchronization program. That is, the time-point synchronization apparatus 10 includes the memory 102 for storing the program which, when their functions are executed by the processor 101, consequently executes steps of performing operations of the L2 protocol processing unit 13 and the time-point synchronization unit 14. The time-point synchronization program is a program which causes the processor 101 to operate as each of the L2 protocol processing unit 13 and the time-point synchronization unit 14.

Data used when the time-point synchronization program is executed, data obtained when the time-point synchronization program is executed, and the like are stored in the storage device as necessary. Each unit of the time-point synchronization apparatus 10 uses the storage device as necessary. As a specific example, the storage device is constituted by at least one of the memory 102, a register in the processor 101, and a cash memory in the processor 101. Note that, the data and the information may have the equivalent meanings. The storage device may be independent from the computer.

A function of the memory 102 may be realized by a different storage device.

The time-point synchronization program may be recorded in a non-volatile recording medium which is computer-readable. As a specific example, the non-volatile recording medium is an optical disc or a flash memory. The time-point synchronization program may be provided as a program product.

\*\*\*Description of Operation\*\*\*

An operation procedure of the time-point synchronization apparatus 10 is equivalent to a time-point synchronization method. Further, a program which realizes an operation of the time-point synchronization apparatus 10 is equivalent to the time-point synchronization program.

Figure 5:
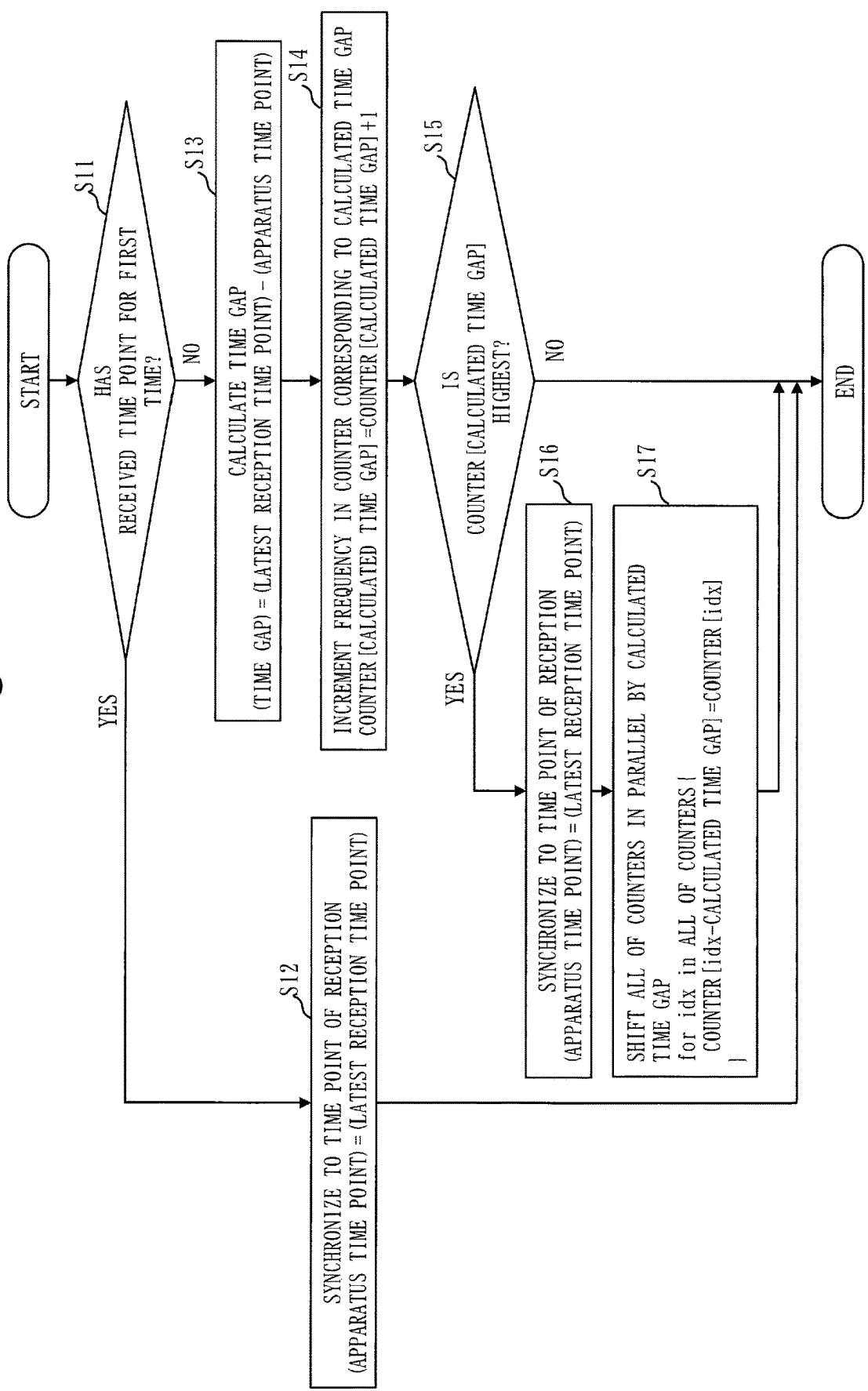
FIG. 5 is a flowchart illustrating an operation of the time-point synchronization apparatus 10 according to the first embodiment.

FIG. 5 is a flowchart illustrating a specific example of a process flow of the time-point synchronization apparatus 10. The time-point synchronization apparatus 10 reduces an error in the time-point synchronization and inconsistency in the error by executing the present process flow. Reducing the inconsistency in the error is to reduce variance in the error.

(Step S11)

The L2 protocol processing unit 13 extracts the reception time-point information from the frame received by the communication interface unit 11.

The PTP-parameter calculation unit 141 calculates the reception time point and determines whether or not the information including the reception time-point information has been received from another apparatus for the first time. The reception time point is a time point indicated in the reception time-point information.

When the information including the reception time-point information has been received from the other apparatus for the first time, the time-point synchronization apparatus 10 proceeds to step S12. Otherwise, the time-point synchronization apparatus 10 proceeds to step S13.

(Step S12)

The time-point management unit 144 synchronizes the apparatus time point to the reception time point. The time-point management unit 144 updates the apparatus time point to the reception time point.

(Step S13)

The time-gap calculation unit 142 calculates the time gap corresponding to the reception time-point information, using the apparatus time point and the reception time point. Below, in descriptions about the present flowchart, the time gap calculated in the present step is referred to as the calculated time gap.

(Step S14)

The time-gap calculation unit 142 increments the frequency in the counter in the time-gap counter 145, corresponding to the calculated time gap.

The time-gap calculation unit 142 increments the frequency in the counter in the time-gap counter 145 as indicated in [Formula 1]. In [Formula 1], a counter [calculated time gap] is a counter in the time-gap counter 145, corresponding to the calculated time gap. The calculated time gap may be a negative value, and may indicate a range which covers the value of the time gap calculated by the time-gap calculation unit 142. Note that, in [Formula 1] and FIG. 5, "=" may represent substitution.

$$\text{counter [calculated time gap]} = \text{counter [calculated time gap]} + 1 \quad \text{[Formula 1]}$$

(Step S15)

The synchronization determination unit 143 determines whether or not the apparatus time point is to be synchronized to the reception time point.

When the value in the counter [calculated time gap] is not the highest among the values in all of the counters, that is, when it is estimated that the error included in the received time points is not the lowest, the time-point synchronization apparatus 10 ends the process in the present flowchart. All of the counters mean all of the counters constituting the time-gap counter 145.

In the other case, that is, when the value in the counter [calculated time gap] is the highest frequency, the time-point synchronization apparatus 10 proceeds to step S16.

(Step S16)

The present step is the same as step S12.

(Step S17)

The time-gap calculation unit 142 shifts the time gap corresponding to each of all of the counters in parallel along the axis so that the time gap corresponding to the counter [calculated time gap] is treated as not existing. A direction to shift the time gaps in parallel may be an ascending direction or a descending direction. The situation where the time gap is treated as not existing includes both the situation where no time gap actually exists and the situation where no time gap substantially exists.

Figure 6:
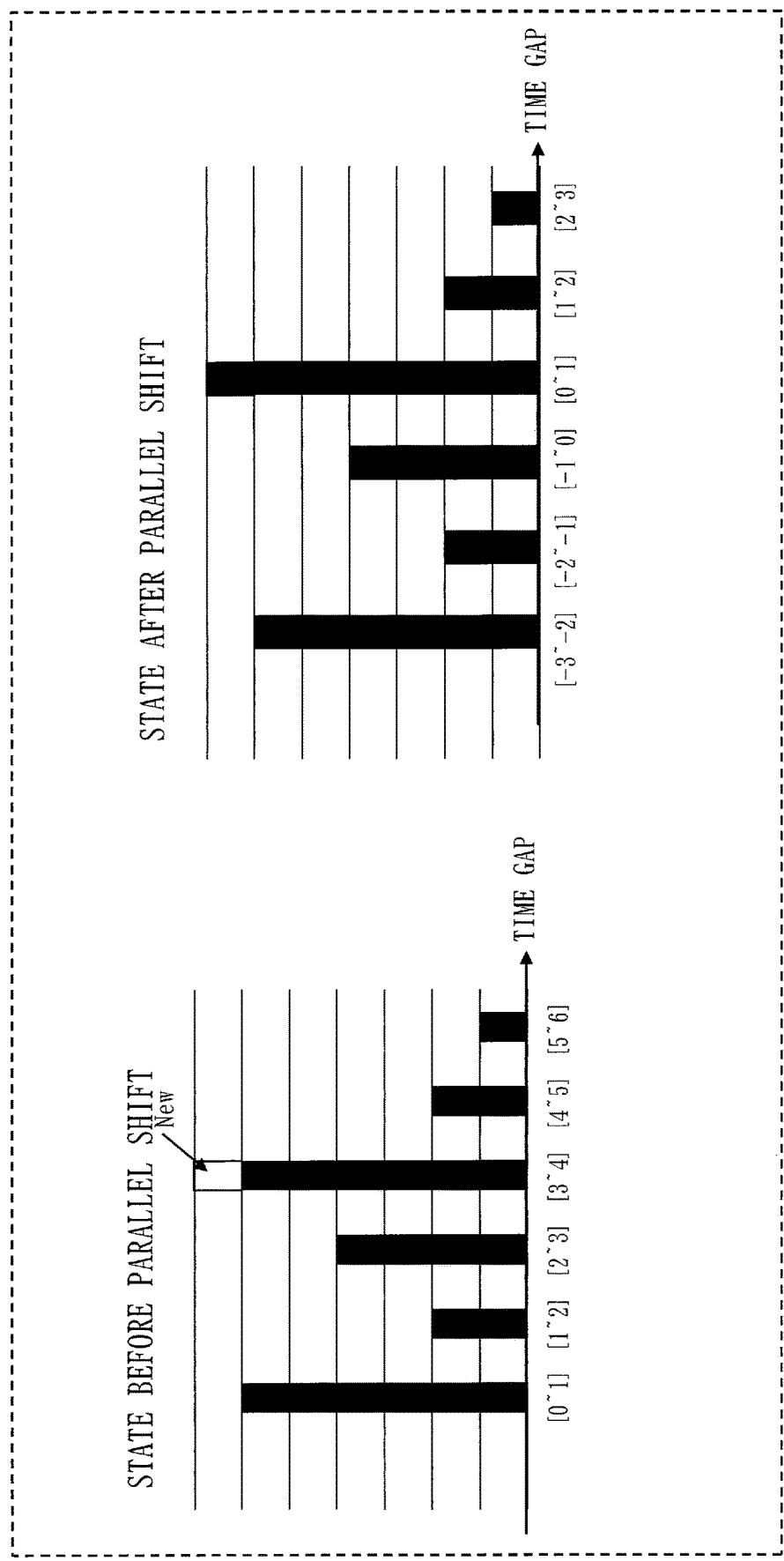
FIG. 6 is a diagram explaining the operation of the time-point synchronization apparatus 10 according to the first embodiment.

FIG. 6 is diagrams explaining an example of a process of the time-point synchronization unit 14. A diagram illustrated on the left corresponds to a state before the time-gap counter 145 has been shifted in parallel. A diagram illustrated on the right corresponds to a state after the time-gap counter 145 has been shifted in parallel. In the present diagrams, a vertical axis indicates the value in the counter, "New" indicates the latest increment which has occurred, and [m to (m+1)] (m is an integer) at a horizontal axis means a gap being equal to or longer than m ns and shorter than (m+1) ns. m to (m+1) corresponds to the time gap. Graphs illustrated in the present diagrams indicate counted values in respective counters [m to (m+1)].

In the present example, since the calculated time gap is equal to or longer than 3 ns and shorter than 4 ns, a counter [3 to 4] has been incremented. Consequently, a value in the counter [3 to 4] has become the highest among the values in all of the counters. Therefore, the time-gap calculation unit 142 has shifted each of all of the counters in parallel in the descending direction so that the counter [3 to 4] becomes a counter [0 to 1]. By this parallel shift, the time gap of the counter [3 to 4] before the parallel shift is treated as not existing. Note that, in the present example, when the time gap is equal to or longer than 0 ns and shorter than 1 ns, the time gap is treated as not existing.

\*\*\*Description of Effect of First Embodiment\*\*\*

As described above, when the time gap corresponding to the reception time point corresponds to the highest frequency, the time-point synchronization apparatus 10 synchronizes the apparatus time point to the reception time point. In this case, the error included in the reception time point is estimated to be the smallest. Here, when all of the reception time points are contemplated, a proportion of the reception time points having small errors is expected to be higher relatively in a long term. Therefore, according to the time-point synchronization apparatus 10 according to the present embodiment, it is possible to obtain effect of improving accuracy of the time-point synchronization and stabilizing the time point in a range where the synchronization error is small, in a system connecting the network apparatuses in a cascading way, as time of operating the system becomes longer.

Therefore, according to the time-point synchronization apparatus 10 according to the present embodiment, it is possible to reduce the error in the time-point synchronization, resulted from a time-stamping error, and the inconsistency in the error in the system connecting the network apparatuses in a cascading way.

*Other Configurations*

First Modification Example

When the counter in the time-gap counter 145, corresponding to the calculated time gap is adjacent to the counter in the time-gap counter 145, corresponding to the highest frequency among all of the frequencies indicated in the time-gap counter 145, the synchronization determination unit 143 may treat the frequency indicated in the counter in the time-gap counter 145, corresponding to the calculated time gap, as the highest among all of the frequencies indicated in the time-gap counter 145.

When the counter [calculated time gap] is close to the counter corresponding the highest frequency in step S15, the time-point synchronization apparatus 10 may proceed to step S16. As a specific example, the counter [calculated time gap] is close to the counter corresponding to the highest frequency, when the counter in the time-gap counter 145, corresponding to the calculated time gap is adjacent to the counter in the time-gap counter 145, corresponding to the highest frequency among all of the frequencies indicated in the time-gap counter 145. As a specific example, supposing that two counters exist, when a lower boundary of a time range corresponding to one counter leads in succession to an upper boundary of a time range corresponding to the other counter, the two counters are adjacent to each other. That is, in a bar graph corresponding to the present example as illustrated in FIG. 6, two bars corresponding to the two counters are adjacent to each other.

Modification Example 2

Even when the value in the counter [calculated time gap] is the highest frequency, the time-point synchronization apparatus 10 does not need to execute the processes in steps S16 and S17 if the time gap of the counter [calculated time gap] is treated as not existing.

Third Modification Example

FIG. 7 illustrates a hardware configuration example of the time-point synchronization apparatus 10 according to the present modification example.

As illustrated in the present diagram, the time-point synchronization apparatus 10 includes a processing circuit 108 instead of at least one of the processor 101 and the memory 102.

The processing circuit 108 is hardware which realizes at least a part of each unit included in the time-point synchronization apparatus 10.

The processing circuit 108 may be dedicated hardware or a processor which executes the program stored in the memory 102.

When the processing circuit 108 is the dedicated hardware, the processing circuit 108 is, as a specific example, a single circuit, a composite circuit, a programmed processor, a parallel-programmed processor, an ASIC (ASIC is Application Specific Integrated Circuit), an FPGA (Field Programmable Gate Array), or a combination of these.

The time-point synchronization apparatus 10 may include a plurality of processing circuits which substitute the processing circuit 108. The plurality of processing circuits share a role of the processing circuit 108.

In the time-point synchronization apparatus 10, a part of functions may be realized by the dedicated hardware, and the rest of the functions may be realized by the software or the firmware.

As a specific example, the processing circuit 108 is realized by the hardware, the software, the firmware, or a combination of these.

The processor 101, the memory 102, and the processing circuit 108 are collectively referred to as "processing circuitry". That is, the functions of the L2 protocol processing unit 13 and the time-point synchronization unit 14 may be realized by the processing circuitry.

Another Embodiment

Although the first embodiment has been described, a plurality of parts in the present embodiment may be combined and implemented. Alternatively, the present embodiment may be partially implemented. In the other cases, various types of modifications may be made to the present embodiment as necessary, and the present embodiment may be implemented entirely, partially, or in any combination.

Note that, the above-described embodiment is a virtually preferable exemplification, and is not indented to limit its applicable subjects and a scope of a purpose of use. Procedures described using the flowchart and the like may be modified as necessary.

REFERENCE SIGNS LIST

10: time-point synchronization apparatus, 11: communication interface unit, 13: L2 protocol processing unit, 14: time-point synchronization unit, 141: PTP-parameter calculation unit, 142: time-gap calculation unit, 143: synchronization determination unit, 144: time-point management unit, 145: time-gap counter, 150: counter storage unit, 101: processor, 102: memory, 103: bus, 104: data forwarding hardware, 108: processing circuit.

The invention claimed is:

1. A time-point synchronization apparatus, which receives as a plurality of pieces of reception information, a plurality of pieces of information each of which includes time-point correspondence information which is information used for calculating a current-time-point equivalent time point that indicates a time point at present and that is equivalent to a current time point which changes with passage of time, the time-point synchronization apparatus comprising:

processing circuitry to manage and maintain the current-time-point equivalent time point as an apparatus time point; and a memory to store a time-gap counter which includes one or more individual counters, on a premise that reception information received the most lately by the time-point synchronization apparatus serves as latest reception information and one or more pieces of reception information other than the latest reception information collectively serve as past reception information, among the plurality of pieces of reception information, where the time-gap counter has been provided according to counter granularity which is granularity corresponding to a time point, and also has been provided by converting into a frequency, each of one or more time gaps indicating each difference between each of current-time-point equivalent time points and each of apparatus time points, and by recording one or more frequencies, each of the current-time-point equivalent time points being calculated using each piece of time-point correspondence information included in each piece of past reception information, each of the apparatus time points being corresponding to a time when the time-point synchronization apparatus receives each piece of past reception information, and wherein the processing circuitry adopts as a latest reception time point, a current-time-point equivalent time point calculated using time-point correspondence information included in the latest reception information, calculates as a calculated time gap, a time gap indicating a difference between the latest reception time point and an apparatus time point corresponding to a time when the latest reception information is received, adopts as a selected counter, a counter in the time-gap counter, corresponding to the calculated time gap, increments a frequency in the selected counter by one, and when the frequency indicated in the selected counter is treated as the highest among all of frequencies indicated in the time-gap counter, synchronizes an apparatus time point at present to a time point corresponding to the latest reception time point.

2. The time-point synchronization apparatus according to claim 1,
wherein the processing circuitry determines whether or not the frequency indicated in the counter in the time-gap counter, corresponding to the calculated time gap is treated as the highest among all of the frequencies indicated in the time-gap counter.

3. The time-point synchronization apparatus according to claim 2,
wherein when the frequency indicated in the counter in the time-gap counter, corresponding to the calculated time gap is the highest among all of the frequencies indicated in the time-gap counter, the processing circuitry treats the frequency indicated in the counter in the time-gap counter, corresponding to the calculated time gap, as the highest among all of the frequencies indicated in the time-gap counter.

4. The time-point synchronization apparatus according to claim 3,
wherein when the frequency indicated in the counter in the time-gap counter, corresponding to the calculated time gap is treated as the highest among all of the frequencies indicated in the time-gap counter, the processing circuitry shifts a whole time-gap counter in parallel so that the calculated time gap is treated as not existing.

5. The time-point synchronization apparatus according to claim 4,
wherein each of the plurality of pieces of reception information includes information conforming to generalized Precision Time Protocol, as the time-point correspondence information, and
wherein the processing circuitry calculates a current-time-point equivalent time point corresponding to the time-point correspondence information included in each of the plurality of pieces of reception information, based on the generalized Precision Time Protocol, using the time-point correspondence information included in each of the plurality of pieces of reception information.

6. The time-point synchronization apparatus according to claim 3,
wherein each of the plurality of pieces of reception information includes information conforming to generalized Precision Time Protocol, as the time-point correspondence information, and
wherein the processing circuitry calculates a current-time-point equivalent time point corresponding to the time-point correspondence information included in each of the plurality of pieces of reception information, based on the generalized Precision Time Protocol, using the time-point correspondence information included in each of the plurality of pieces of reception information.

7. The time-point synchronization apparatus according to claim 2,
wherein when the counter in the time-gap counter, corresponding to the calculated time gap is adjacent to a counter in the time-gap counter, corresponding to the highest frequency among all of the frequencies indicated in the time-gap counter, the processing circuitry treats the frequency indicated in the counter in the time-gap counter, corresponding to the calculated time gap, as the highest among all of the frequencies indicated in the time-gap counter.

8. The time-point synchronization apparatus according to claim 7,
wherein when the frequency indicated in the counter in the time-gap counter, corresponding to the calculated time gap is treated as the highest among all of the frequencies indicated in the time-gap counter, the processing circuitry shifts a whole time-gap counter in parallel so that the calculated time gap is treated as not existing.

9. The time-point synchronization apparatus according to claim 8,
wherein each of the plurality of pieces of reception information includes information conforming to generalized Precision Time Protocol, as the time-point correspondence information, and
wherein the processing circuitry calculates a current-time-point equivalent time point corresponding to the time-point correspondence information included in each of the plurality of pieces of reception information, based on the generalized Precision Time Protocol, using the time-point correspondence information included in each of the plurality of pieces of reception information.

10. The time-point synchronization apparatus according to claim 7,
wherein each of the plurality of pieces of reception information includes information conforming to generalized Precision Time Protocol, as the time-point correspondence information, and
wherein the processing circuitry calculates a current-time-point equivalent time point corresponding to the time-point correspondence information included in each of the plurality of pieces of reception information, based on the generalized Precision Time Protocol, using the time-point correspondence information included in each of the plurality of pieces of reception information.

11. The time-point synchronization apparatus according to claim 2,
wherein when the frequency indicated in the counter in the time-gap counter, corresponding to the calculated time gap is treated as the highest among all of the frequencies indicated in the time-gap counter, the processing circuitry shifts a whole time-gap counter in parallel so that the calculated time gap is treated as not existing.

12. The time-point synchronization apparatus according to claim 11,
wherein each of the plurality of pieces of reception information includes information conforming to generalized Precision Time Protocol, as the time-point correspondence information, and
wherein the processing circuitry calculates a current-time-point equivalent time point corresponding to the time-point correspondence information included in each of the plurality of pieces of reception information, based on the generalized Precision Time Protocol, using the time-point correspondence information included in each of the plurality of pieces of reception information.

13. The time-point synchronization apparatus according to claim 2,
wherein each of the plurality of pieces of reception information includes information conforming to generalized Precision Time Protocol, as the time-point correspondence information, and
wherein the processing circuitry calculates a current-time-point equivalent time point corresponding to the time-point correspondence information included in each of the plurality of pieces of reception information, based on the generalized Precision Time Protocol, using the time-point correspondence information included in each of the plurality of pieces of reception information.

14. The time-point synchronization apparatus according to claim 1,
wherein when the frequency indicated in the counter in the time-gap counter, corresponding to the calculated time gap is treated as the highest among all of the frequencies indicated in the time-gap counter, the processing circuitry shifts a whole time-gap counter in parallel so that the calculated time gap is treated as not existing.

15. The time-point synchronization apparatus according to claim 14,
wherein each of the plurality of pieces of reception information includes information conforming to generalized Precision Time Protocol, as the time-point correspondence information, and
wherein the processing circuitry calculates a current-time-point equivalent time point corresponding to the time-point correspondence information included in each of the plurality of pieces of reception information, based on the generalized Precision Time Protocol, using the time-point correspondence information included in each of the plurality of pieces of reception information.

16. The time-point synchronization apparatus according to claim 1,
wherein each of the plurality of pieces of reception information includes information conforming to generalized Precision Time Protocol, as the time-point correspondence information, and
wherein the processing circuitry calculates a current-time-point equivalent time point corresponding to the time-point correspondence information included in each of the plurality of pieces of reception information, based on the generalized Precision Time Protocol, using the time-point correspondence information included in each of the plurality of pieces of reception information.

17. A time-point synchronization method by a time-point synchronization apparatus which receives as a plurality of pieces of reception information, a plurality of pieces of information each of which includes time-point correspondence information which is information used for calculating a current-time-point equivalent time point that indicates a time point at present and that is equivalent to a current time point which changes with passage of time, the time-point synchronization method comprising:
managing and maintaining, by a time-point management unit, the current-time-point equivalent time point as an apparatus time point;
storing, by a counter storage unit, a time-gap counter which includes one or more individual counters, on a premise that reception information received the most lately by the time-point synchronization apparatus serves as latest reception information and one or more pieces of reception information other than the latest reception information collectively serve as past reception information, among the plurality of pieces of reception information, where the time-gap counter has been provided according to counter granularity which is granularity corresponding to a time point, and also has been provided by converting into a frequency, each of one or more time gaps indicating each difference between each of current-time-point equivalent time points and each of apparatus time points, and by recording one or more frequencies, each of the current-time-point equivalent time points being calculated using each piece of time-point correspondence information included in each piece of past reception information, each of the apparatus time points being corresponding to a time when the time-point synchronization apparatus receives each piece of past reception information; and
adopting, by a time-gap calculation unit, as a latest reception time point, a current-time-point equivalent time point calculated using time-point correspondence information included in the latest reception information, calculating as a calculated time gap, a time gap indicating a difference between the latest reception time point and an apparatus time point corresponding to a time when the latest reception information is received, adopting as a selected counter, a counter in the time-gap counter, corresponding to the calculated time gap, incrementing a frequency in the selected counter by one, and when the frequency indicated in the selected counter is treated as the highest among all of frequencies indicated in the time-gap counter, synchronizing an apparatus time point at present to a time point corresponding to the latest reception time point.

18. A non-transitory computer readable medium storing a time-point synchronization program which causes a computer which receives as a plurality of pieces of reception information, a plurality of pieces of information each of which includes time-point correspondence information which is information used for calculating a current-time-point equivalent time point that indicates a time point at present and that is equivalent to a current time point which changes with passage of time, the computer storing a time-gap counter which includes one or more individual counters, on a premise that reception information received the most lately by the computer serves as latest reception information and one or more pieces of reception information other than the latest reception information collectively serve as past reception information, among the plurality of pieces of reception information, where the time-gap counter has been provided according to counter granularity which is granularity corresponding to a time point, and also has been provided by converting into a frequency, each of one or more time gaps indicating each difference between each of current-time-point equivalent time points and each of apparatus time points, and by recording one or more frequencies, each of the current-time-point equivalent time points being calculated using each piece of time-point correspondence information included in each piece of past reception information, each of the apparatus time points being corresponding to a time when the computer receives each piece of past reception information:
  to manage and maintain the current-time-point equivalent time point as an apparatus time point; and
  to adopt as a latest reception time point, a current-time-point equivalent time point calculated using time-point correspondence information included in the latest reception information, calculate as a calculated time gap, a time gap indicating a difference between the latest reception time point and an apparatus time point corresponding to a time when the latest reception information is received, adopt as a selected counter, a counter in the time-gap counter, corresponding to the calculated time gap, increment a frequency in the selected counter by one, and when the frequency indicated in the selected counter is treated as the highest among all of frequencies indicated in the time-gap counter, synchronize an apparatus time point at present to a time point corresponding to the latest reception time point.

* * * * *